United States Patent [19]

Runberg et al.

[11] 4,087,073
[45] May 2, 1978

[54] SAFETY VALVE WITH A HYDRAULIC ACTUATOR

[75] Inventors: James E. Runberg; Karl N. Tunstall, both of Dallas County, Tex.

[73] Assignee: Otis Engineering Corporation, Dallas, Tex.

[21] Appl. No.: 679,892

[22] Filed: Apr. 26, 1976

[51] Int. Cl. ............................................. F16k 31/122
[52] U.S. Cl. ...................................... 251/28; 91/440; 137/458; 137/489
[58] Field of Search ........................ 91/437, 438, 440; 92/86; 137/458; 251/26, 28

[56] References Cited

U.S. PATENT DOCUMENTS

| | | | |
|---|---|---|---|
| 1,807,173 | 5/1931 | Ray | 91/437 |
| 2,344,055 | 3/1944 | Osborn | 91/437 |
| 2,431,032 | 11/1947 | Ernst | 91/438 |
| 2,454,551 | 11/1948 | Carlson | 91/438 |
| 2,566,772 | 9/1951 | Otis | 251/26 |
| 2,631,606 | 3/1953 | Parks | 137/489 |
| 2,679,261 | 5/1954 | Otis | 137/458 |
| 2,898,867 | 8/1959 | Saalfrank | 92/86 |
| 2,986,157 | 5/1961 | Dollison | 137/458 |
| 2,996,074 | 8/1961 | Page et al. | 251/282 |
| 3,043,331 | 7/1962 | Peters | 137/458 |
| 3,168,854 | 2/1965 | Neilson | 91/437 |
| 3,232,174 | 2/1966 | Grimmer | 137/458 |
| 3,869,963 | 3/1975 | Schindel | 92/86 |

Primary Examiner—Martin P. Schwadron
Assistant Examiner—G. L. Walton
Attorney, Agent, or Firm—Vinson & Elkins

[57] ABSTRACT

Disclosed is a safety valve and hydraulic actuator for the safety valve. The safety valve includes a valve body and a valve member. The hydraulic actuator is adapted to be attached to the valve body and includes a cylinder and piston. A pilot valve controls the pressurizing of the cylinder to affect movement of the piston. This abstract is neither intended to define the scope of the invention, which, of course, is measured by the claims nor is it intended to be limiting in any way.

6 Claims, 3 Drawing Figures

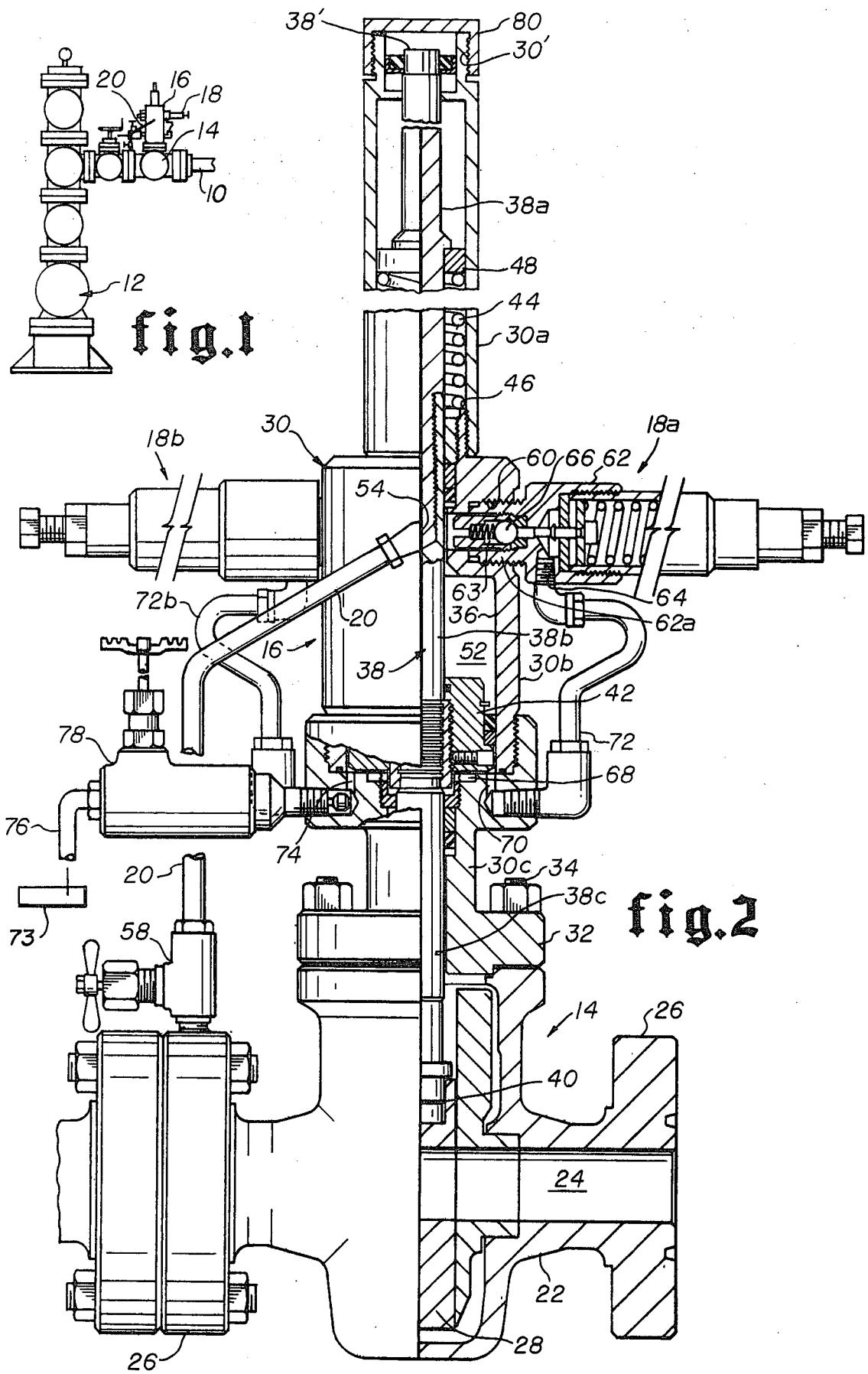

4,087,073

SAFETY VALVE WITH A HYDRAULIC ACTUATOR

BACKGROUND OF THE INVENTION

1. Field of the Invention

This invention relates to a safety valve and hydraulic actuator and more particularly to a safety valve for controlling flow in a well line and to a hydraulic actuator for controlling the operation of the safety valve. The hydraulic actuator is designed to be operated in conjunction with a pilot valve having an exhaust port.

2. The Prior Art

The combination of a safety valve, hydraulic actuator for the safety valve, and a pilot valve to control the actuator is disclosed by U.S. Pat. No. 2,693,819 to Otis.

Hydraulic actuators for safety valve may take the form of a type U or type UX Otis hydraulic actuator illustrated on pages 4026 and 4028 of the 1974–1975 "COMPOSIT CATALOGUE OF OIL FIELD EQUIPMENT & SERVICES" or the Baker HYDRA-MATIC actuator illustrated on page 387 of the 1974–1975 "COMPOSIT CATALOGUE OF OIL FIELD EQUIPMENT & SERVICES."

However the above actuators have one main problem. They are designed to be operated by a pilot valve that vents the control pressure to the atmosphere. In recent years, increased environmental concern has led to an attempt to provide an actuator-pilot valve system wherein the pilot valve does not vent the control pressure to the atmosphere. However, many pilot valves do include an exhaust port through which control pressure is vented to the atmosphere. For example, see U.S. Pat. Nos. 2,986,157 to Dollison; 3,026,904 to Dollison; and 3,621,881 to Vicari and the type P, type B, and type D, pilots illustrated on pages 4031 and 4033 of the 1974–1975 "COMPOSIT CATALOGUE OF OIL FIELD EQUIPMENT & SERVICES."

To eliminate the exhaust of control fluids, ventless pilot valves have been utilized in combination with a safety valve. For example, see U.S. Pat. Nos. 2,843,371 to Liljestrand; 3,092,136 to Willis; and 3,800,822 to Baker. One problem with the structure disclosed in the last two mentioned patents is that they require the use of a single safety valve, actuator, and pilot valve combination. There is little, if any, interchangeability between the type of safety valves, actuators, and pilot valves that may be utilized in the combination.

OBJECT OF THE INVENTION

It is an object of this invention to provide a combination safety valve and hydraulic actuator which may be utilized with conventional, venting pilot valves but which eliminates the venting of fluid to the atmosphere.

Another object of this invention is to provide a pilot operated hydraulic actuator useable with conventional venting pilot valves but which prevents the venting to the atmosphere of control pressure, said hydraulic actuator being adapted to be useable with conventional gate valves.

Another object of this invention is to provide a hydraulic actuator adapted to be used with a conventional venting pilot valve but which confines the vented fluid and is adapted to be useable with conventional safety valves.

These and other objects and features of advantage of this invention will be apparent from the drawings, the detailed description, and the appended claims.

BRIEF DESCRIPTION OF THE DRAWINGS

In the drawings wherein like numerals indicate like parts, and wherein an illustrative embodiment of this invention is shown, FIG. 1 illustrates a safety valve in accordance with this invention installed in a well flow line having a hydraulic actuator and pilot valve;

FIG. 2 is a view partly in cross-section and partly in elevation, of a safety valve and hydraulic actuator with the valve open.

DESCRIPTION OF THE PREFERRED EMBODIMENTS

Figure 3:
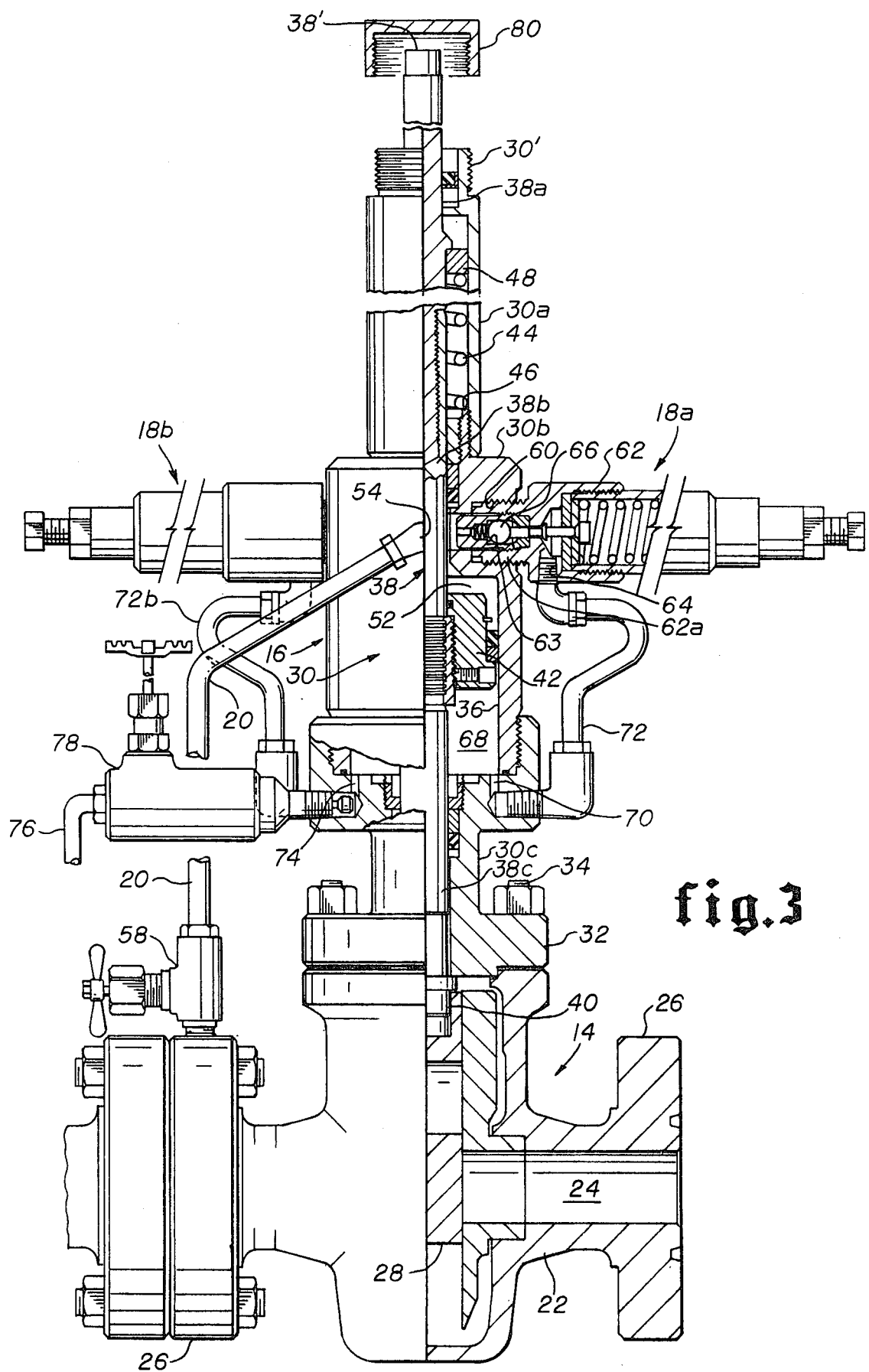
FIG. 3 is a view, partly in cross-section and partly in elevation of a safety valve and hydraulic actuator with the valve closed.

Well flow lines extend from the well head to and between separators, condensors, and storage equipment. To control the flow of well fluids through these flow lines, safety valves are positioned therein. Generally, it is desirable to have the safety valves open or shut in response to flow conditions, and for this purpose, pressure responsive pilot valves and safety valve actuators have been used.

For example, the well flow line 10 may extend from the christmas tree, generally indicated at 12, to a remote location (not shown). Disposed in the flow line is a main valve 14. In accordance with this invention, the main, safety valve 14 is operated by a hydraulic actuator 16 which in turn is adapted to operate in response to pilot valve 18.

Pilot valve 18 may be sensitive to fluid pressure from any location. In FIG. 1, conduit means 20 extends from actuator 16 to the location where it is desired to sense fluid pressure. Fluid from the remote location flows through conduit means 20 to the actuator 16 where it is sensed by the pilot valve 18. Pilot valve 18 operates in response to the sensed fluid conditions to actuate the hydraulic actuator, which in turn closes the safety valve when the sensed fluid pressure leaves an acceptable range.

In FIG. 2, the main valve, hydraulic actuator, and pilot valve are shown in greater detail.

The main valve, generally indicated at 14, includes valve body means 22 having flow passage means 24 therethrough. The main valve body means 22 has means, such as flanges 26, to permit the valve body means 22 to be connected into a well flow line.

To control flow through passage means 24, valve member means 28 is disposed within valve body means 22. Valve member means 28 is adapted to move between positions opening (See FIG. 2) and closing (See FIG. 3) flow passage means 24. The illustrated valve member means 28 is a gate valve member.

The hydraulic actuator means, illustrated generally at 16, is designed to operate valve member means 28 and includes housing means having a cylinder means, stem operator means to operate the valve member means, a piston means carried by stem operator means and disposed within the cylinder means, means to bias the stem operator means to a valve closing position, and means to move the stem operator means to a valve opening position.

The housing means, generally indicated at 30 contains the various components of the hydraulic actuator means 16 and includes interconnected tubular sections 30a, 30b and 30c. Housing means 30 is adapted to be connected to valve body means 22 and for this purpose includes flange means 32 through which bolts 34 may be inserted.

Cylinder means 36 is included within housing means 30 and is pressurized to operate valve member means 28 of the safety valve 14.

Stem operator means, indicated generally at 38, moves valve member means 28 and includes interconnected stem portions 38a, 38b and 38c. Stem operator means 38 is disposed within housing means 30 and is adapted to be operably connected to valve member means 28. For this purpose, means, such as connector means 40, are provided to connect stem operator means 38 to valve means 28. Stem operator means 38 is moveable within housing means 30 between a first position wherein valve member means 28 opens passage means 24 (as shown in FIG. 2) and a second position wherein valve member means 28 closes passage means 24 (as shown in FIG. 3).

Stem operator means 38 is moved between its first and second positions in response to a biasing force and in response to force exerted upon piston means 42 which is carried by stem operator means 38.

To provide for a fail safe, valve closing actuator, hydraulic actuator means 16 includes means for biasing valve member means 28 to a position closing passage means 24. Valve member means 28 is biased this position by biasing stem operator means 38 to its second position. As illustrated, the biasing means preferably includes spring biasing means 44 disposed between shoulder means 46 of housing means 30 and shoulder means 48 of stem portion 38a.

The illustrated housing means 30 surrounds stem portion 38a and spring biasing means 44 to prevent damage to these parts. When stem operator means 38 has been moved to its second position and valve member means 28 is closing passage means 24, stem portion 38a is moved to an extended position with respect to housing means 30 (See FIG. 3).

To move valve member means 28 to a position opening flow passage means 24, force is exerted on piston means 42 by pressurizing cylinder means 36 on one side 52 of piston means 42. The force exerted by this pressurizing is greater than the force exerted on stem operator means by spring biasing means 44 and maintains stem operator means 38 in its first position.

To pressurize the one side 52 of cylinder means 36, control fluid is injected into cylinder means 36 on said one side 52 from a desired source. Communicating means extend between the source of control fluid and said one side 52 of cylinder means 36. As illustrated in FIG. 2, the control fluid source may be the safety valve 14 flow passage means 24 just upstream of the valve member means 28. Communicating means extending between the source and said one side 52 includes first port means 54 through housing means 30 into the one side 52 of cylinder means 36 to permit injection of control fluid therein. Conduit means 20 communicates between the source of control fluid and first port means 54. If desired, valve means 58 is positioned in conduit means 20 to control the flow of fluid therethrough. Control fluid flows from the source, through conduit means 20, through first port means 54 and into the one side 52 of cylinder means 36, thereby pressurizing the latter.

Pilot valve means 18 regulates the pressurizing of the cylinder means 36 and thereby controls the operation of the hydraulic actuator means 16. Pilot valve means 18 is sensitive to the pressure of control fluid within the one side 52 of cylinder means 36 and is designed to open when the pressure is no longer within an acceptable range. For example, it may be desirous to close passage means 24 when the pressure of control fluid either exceeds a certain amount and/or is below a certain amount. The pilot valve 18 may be any type of pilot valve which is normally closed when the pressure is within an acceptable range and is opened when the pressure is no longer within an acceptable range. The pilot valve 18 is of a venting type. A single pilot valve responsive to both high and low pressure conditions such as the type P pilot valve offered by Otis Engineering Corporation and illustrated on page 4031 of the 1974-1975 "COMPOSITE CATALOGUE OF OIL FIELD EQUIPMENT & SERVICES" or the pilot valve disclosed in U.S. Pat. No. 3,026,904, which is hereby incorporated by reference for all purposes, may be utilized. On the other hand, any desired combination of a high pressure pilot valve, such as the type D pilot illustrated on page 4033 of the "COMPOSITE CATALOGUE OF OIL FIELD EQUIPMENT & SERVICES" and offered by Otis Engineering Corporation and a low pressure pilot valve, such as the type B pilot offered by Otis Engineering Corporation illustrated on page 4033 of the 1974-1975 "COMPOSITE CATALOGUE OF OIL FIELD EQUIPMENT & SERVICES" may be used.

Illustrated pilot valve means 18a is a low pressure pilot valve while pilot valve means 18b is a high pressure pilot valve.

To permit pilot valve means 18 to be attached to housing means in communication with fluid within the one side 52 of cylinder means 36, boss means 60 extends through housing means 30 into said one side 52 of cylinder means 36. Boss means 60 is adapted to receive the pilot valve means 18.

Pilot valve means 18 includes body means 62 having one end 62a adapted to be received within boss means 60. The pilot valve body means 62 has a flow passageway 63 extending therethrough from the cylinder means to an exhaust port means 64. A pilot valve member means 66 controls fluid flow through passageway 63. The valve member means 66 is designed to close passageway 63 when the fluid pressure within cylinder means 36 is within an acceptable pressure range. However, when the pressure is not within an acceptable range, pilot valve member means 66 opens passageway 63.

When the pilot valve member means 66 opens passageway 63, the fluid within the one side 52 of cylinder means 36 flows through the passageway 63 of pilot valve means 18 and out exhaust port means 64. In accordance with this invention this control fluid is prevented from the venting to the atmosphere or to the environment and instead is utilized to render piston means 42 ineffective to permit biasing means 44 to move the stem operator means 38 to its second position thereby moving valve member means 28 to a position closing flow passage means 24.

To render piston means 42 ineffective the exhausted fluid is communicated to cylinder means 36 on the other side 68 of piston means 42. To communicate the exhausted fluid to said other side 68, second port means 70 extends through housing means 30 into the other side of cylinder means 36 and a communicating flow line 72 extends between exhaust port means 64 and second port means 70.

Means are provided to discharge the fluid within the the other side 68 of cylinder means 36 so that hydraulic actuator means 16 may be returned to its operative position with stem operator means 38 in its first position. Preferably, to protect the environment, the fluid is discharged to a reservoir. To conduct the control fluid to the fluid reservoir 73, third port means 74 extend through said housing means 30 into the other side 68 of cylinder means 36. Discharge conduit means 76 communicates between third port means 74 and the fluid reservoir 73.

Preferably, means are provided to prevent a premature build up of fluid within the other side 68 of cylinder means 36 so that piston means 42 is not prematurely pressure balanced. A slow buildup of fluid within the other side 68 of cylinder means 36 is prevented by valve means 78 in discharge conduit means 76. Valve means 78 is normally open and permits a slow flow of fluid at low pressure therethrough thereby preventing a buildup of fluid pressure within the other side 68 due to leakage either around piston means 42 or through pilot valve means 18. However, upon a sudden surge of flow through valve means 78, as would happen when pilot valve 18 opens, valve means 78 closes. Valve means 78 may be a type M velocity check valve offered by Otis Engineering Corporation and illustrated on page 4034 of the 1974-1975 "COMPOSITE CATALOGUE OIL FIELD EQUIPMENT & SERVICES."

Sometimes it is desirable to manually prevent hydraulic actuator means 16 from operating and thereby maintain valve member means 28 of safety valve means 14 in a position opening flow passage means 24. To do so, stem operator means 38 is maintained in its first position and prevented from moving to its second position. One manner of preventing stem operator means 38 from moving to its second position is to attach lockout cap means 80 to one end 30' of housing means 30. Although in FIG. 3 lockout cap means 80 is illustrated as being disconnected from the one end 30' of the housing means 30, it is to be understood that when it is attached thereto (as shown in FIG. 2) it will engage the one end 38' of stem portion 38a and will prevent extension of stem operator means 38 with respect to housing means 30.

In operation the safety system is utilized to control flow through a well flow line 10. The system controls flow in response to fluid pressure conditions at any desired location. Thus, for example as shown the safety system may control flow in response to fluid conditions just upstream of the safety valve 14.

Fluid from the desired location is the source of control fluid for the hydraulic actuator 16 and flows through control conduit means 20 to the one side 52 of piston means 42 within cylinder means 36. Cylinder means 36 is pressurized on this one side 52. Stem operator means 38 is moved to its first position (shown in FIG. 2), and with cylinder means 36 pressurized on the one side 52, piston means 42 is effective to maintain stem operator means 38 in its first position. Stem operator means 38 is operably connected to valve member means 28 and maintains the latter to a position opening flow passage means 24 of safety valve means 14.

As long as the pressure of the control fluid remains within an acceptable range the one side 52 of cylinder means 36 remains pressurized and the other side 68 remains unpressurized. Even if fluid leaks by piston means 42 or through pilot valve means 18, a build up of fluid pressure within the other side 68 of cylinder means 36 is prevented by permitting the fluid to flow through valve means 78 and discharge conduit means 76 to the fluid reservoir 73.

The hydraulic actuator means closes the safety valve means 14 when the pressure of the control fluid is no longer within an acceptable range. For example, pilot valve means 18a senses the pressure of the control fluid within the one side 52 of cylinder means 36. In response to abnormally low pressure conditions pilot valve member means 66 opens flow passageway 63 through pilot valve means 18a to permit a control fluid to communicate between both sides 52 and 68 of piston means 42. The control fluid flows from the one side 52, through pilot valve means 18a and communicating flow line means 72 to the other side 68 of cylinder means 36. Pilot valve means 18 remains open rendering piston means 42 ineffective. With piston means 42 ineffective, the biasing means 40 moves stem operator means 38 its second position and valve member means 28 closes flow passage means 24.

When stem operator means 38 moves to its second position, the end 38' of stem portion 38a projects beyond the end 30' of housing means 30. This projection provides a visual indication of when hydraulic actuator means 16 has operated to close safety valve means 14.

When it is desired to reopen safety valve means 14, control fluid is discharged from the other side 68 of the cylinder means 36 through discharge conduit means 76 by opening valve means 78. The pilot valve means is reset so that pilot valve member 66 closes passageway 63. The hydraulic actuator 16 is reset by moving stem operator means 38 to its first position and pressurizing the one side 52 of cylinder means 36.

Once the safety valve means 14 is opened it may be manually maintained in an open position by attaching the lockout cap means 80 to the end 30' of the housing means thereby preventing stem operator 38 means from moving to its second position.

From the foregoing it can be seen that the objects of this invention have been obtained. A safety system has been provided including in combination a safety valve, a hydraulic actuator for the safety valve, and a pilot valve. The safety system prevents a venting to the atmosphere or to the environment of control fluid even though the pilot valve is a venting pilot valve.

The foregoing disclosure and description of the invention are illustrative and explanatory hereof and various changes in the size, shape of materials, as well as in the details of the illustrative construction may be made within the scope of the appended claims without departing from the spirit of the invention.

We claim:
1. In combination
   main valve means including:
      main valve body means having flow passage means therethrough,
      said valve body means adapted to be connected into a flow line, and
      valve member means movable between positions opening and closing said flow passage;
   hydraulic actuator means including:
      housing means connected to said main valve body means,
      said housing means including cylinder means,
      stem operator means disposed in said housing means and operably connected to said valve member means,
      piston means carried by said stem operator means and disposed within said cylinder means, first port means in said housing means and opening into said cylinder means on one side of said piston means to permit conduction of control fluid into said cylinder means, second port means in said housing means and opening into said cylinder means on the other side of said piston means, and biasing means for biasing said stem operator means to a position wherein said valve member means closes said flow passage;

pilot valve means including:

pilot valve body means attached to said housing means and in communication with said cylinder on said one side of said piston means;

exhaust port means in said pilot valve body means, said pilot valve body means having passageway means for communicating between said cylinder means on said one side of said piston means and said exhaust port means, and pilot valve member means to control flow through said passageway means, said pilot valve member means preventing flow through said passageway means when fluid pressure in said cylinder means on said one side of said piston means is within an acceptable range and permitting flow when said fluid pressure is no longer within an acceptable range; and communicating means extending between said exhaust port means and said second port means for communicating fluid between said exhaust port means and said second port means and for equalizing the fluid pressure on opposite sides of said piston means when the pilot valve means permits flow through said passageway means.

2. The combination including:

main valve means including:

main valve body means having flow passage means therethrough, said valve body means adapted to be connected into a flow line, and valve member means movable between positions opening and closing said flow passage;

hydraulic actuator means including:

housing means connected to said main valve body means, said housing means including cylinder means, stem operator means disposed in said housing means and operably connected to said valve member means, piston means carried by said stem operator means and disposed within said cylinder means, first port means in said housing means and opening into said cylinder means on one side of said piston means to permit conduction of control fluid into said cylinder means, second port means in said housing means and opening into said cylinder means on the other side of said piston means, and biasing means for biasing said stem operator means to a position wherein said valve member means closes said flow passage;

pilot valve means including:

pilot valve body means attached to said housing means and in communication with said cylinder on said one side of said piston means, exhaust port means in said pilot valve body means, said pilot valve body means having passageway means communicating between said cylinder means on said one side of said piston means and said exhaust port means, and pilot valve member means to control flow through said passageway means;

communicating means extending between said exhaust port means and said second port means for communicating fluid between said exhaust port means and said second port means and for equalizing the fluid pressure on opposite sides of said piston means when the pilot valve means opens;

third port means in said housing means and opening into said piston cylinder means on said other side of said piston means;

conduit means for communicating between said third port means and fluid reservoir means; and velocity valve means in said conduit means to control fluid flow in said conduit means and adapted to permit a slow fluid flow of low pressure fluid through said conduit means and adapted to close upon a surge of fluid through said conduit means.

3. A valve actuator adapted to control a main valve including a body with a flow passage therethrough and a main valve member movable between positions opening and closing said flow passage, the valve actuator comprising:

housing means adapted to be connected to the body of the main valve;

said housing means including cylinder means, stem operator means disposed in said housing means and adapted to be operably connected to the main valve member to move the main valve member between positions opening and closing the flow passage;

piston means carried by said stem operator means and disposed in said cylinder means;

biasing means for biasing said stem operator means to a position wherein the main valve member closes the flow passage;

first port means through said housing means to permit injection of control fluid into said cylinder means on one side of said piston means;

communicating means for communicating between said cylinder means on one side of said piston means and said cylinder means on the other side of said piston means;

pilot valve means to control flow through said communicating means;

said pilot valve means being sensitive to the pressure of control fluid within said cylinder means on said one side of said piston means and adapted to normally close said communicating means when the pressure of controlled fluid is within an acceptable range and adapted to automatically move to a position opening said communicating means when the pressure of control fluid is no longer in an acceptable range;

said communicating means equalizing the fluid pressure on opposite sides of said piston means when said pilot valve means is in its opening position and thereby rendering said piston means ineffective and permitting said biasing means to move said stem operator means to a position wherein the main valve member closes the flow passage.

4. A valve actuator adapted to control a main valve including a body with a flow passage therethrough and a main valve member movable between positions opening and closing said flow passage, the valve actuator comprising:

housing means adapted to be connected to the body of the main valve;

said housing means including cylinder means, stem operator means disposed in said housing means and adapted to be operably connected to the main valve member to move the main valve member between positions opening and closing the flow passage;

piston means carried by said stem operator means and disposed in said cylinder means;

biasing means for biasing said stem operator means to a position wherein the main valve member closes the flow passage;

first port means through said housing means to permit injection of control fluid into said cylinder means on one side of said piston means;

communicating means for communicating between said cylinder means on one side of said piston means and said cylinder means on the other side of said piston means;

pilot valve means to control flow through said communicating means;

said pilot valve means being sensitive to the pressure of control fluid and closing said communicating means when the pressure of controlled fluid is within an acceptable range and adapted to open said communicating means when the pressure of control fluid is no longer in an acceptable range;

said communicating means, when opened by said pilot valve means, communicating fluid between both sides of said piston means and thereby rendering said piston means ineffective and permitting said biasing means to move said stem operator means to a position wherein the valve member closes the flow passage;

third port means in said housing means and opening into said piston cylinder means on said other side of said piston means;

discharge conduit means for communicating between said third port means and fluid reservoir means; and velocity valve means in said discharge conduit means to control fluid flow in said conduit means and adapted to permit a slow fluid flow of low pressure fluid through said discharge conduit means and adapted to close upon a surge of fluid flow through said discharge conduit means.

5. A hydraulic actuator designed to cooperate with pilot valve means having exhaust port means to control a main valve including a valve body having a flow passage therethrough and a main valve member movable between positions opening and closing said flow passage; the hydraulic actuator comprising:

housing means adapted to be connected to the main valve body;

said housing means including cylinder means;

stem operator means disposed in said housing means and adapted to be operably connected to the main valve member;

piston means carried by said stem operator means and disposed within said cylinder means;

first port means through said housing means and opening into said cylinder means on one side of said piston means to permit injection of control fluid into said cylinder means;

aperture means communicating into said cylinder means on said one side of said piston means and adapted to receive the pilot valve;

second port means through said housing means and opening into said cylinder means on the other side of said piston means and adapted to be in communication with the pilot valve exhaust port;

and biasing means for biasing said valve member operator means to a position wherein said main valve member closes the flow passage;

said piston means being adapted to maintain said stem operator means in a position wherein the main valve member opens the flow passage while said piston chamber means is pressurized on said one side of said piston means by control fluid and being adapted to be rendered ineffective to permit said biasing means to move said stem operator to a position wherein said main valve is closed.

6. A hydraulic actuator designed to cooperate with pilot valve means having exhaust port means to control a main valve including a valve body having a flow passage therethrough and a main valve member movable between positions opening and closing said flow passage; the hydraulic actuator comprising:

housing means adapted to be connected to the main valve body;

said housing means including cylinder means;

stem operator means disposed in said housing means and adapted to be operably connected to the main valve member;

piston means carried by said stem operator means and disposed within said cylinder means;

first port means through said housing means and opening into said cylinder means on one side of said piston means to permit injection of control fluid into said cylinder means;

aperture means communicating into said cylinder means on said one side of said piston means and adapted to receive the pilot valve;

second port means through said housing means and opening into the other side of said piston means and adapted to be in communication with the pilot valve exhaust port;

biasing means for biasing said valve member operator means to a position wherein said main valve member closes the flow passage;

said piston means being adapted to maintain said stem operator means in a position wherein the main valve member opens the flow passage while said piston chamber means is pressurized on said one side of said piston by control fluid and being adapted to be rendered ineffective to permit said biasing means to move said stem operator to a position wherein said main valve is closed;

third port means through said housing means and opening into said piston cylinder means on said other side of said piston means;

conduit means communicating between said third port means and fluid reservoir means; and velocity valve means in said conduit means to control fluid flow in said conduit means adapted to permit a slow flow of fluid at low pressure through said conduit means and adapted to close upon a surge of fluid through said conduit means.

* * * * *